J. D. HAWES.
BAND CUTTER AND FEEDER.
APPLICATION FILED OCT. 18, 1905.
1,038,747.
Patented Sept. 17, 1912.
3 SHEETS—SHEET 1.
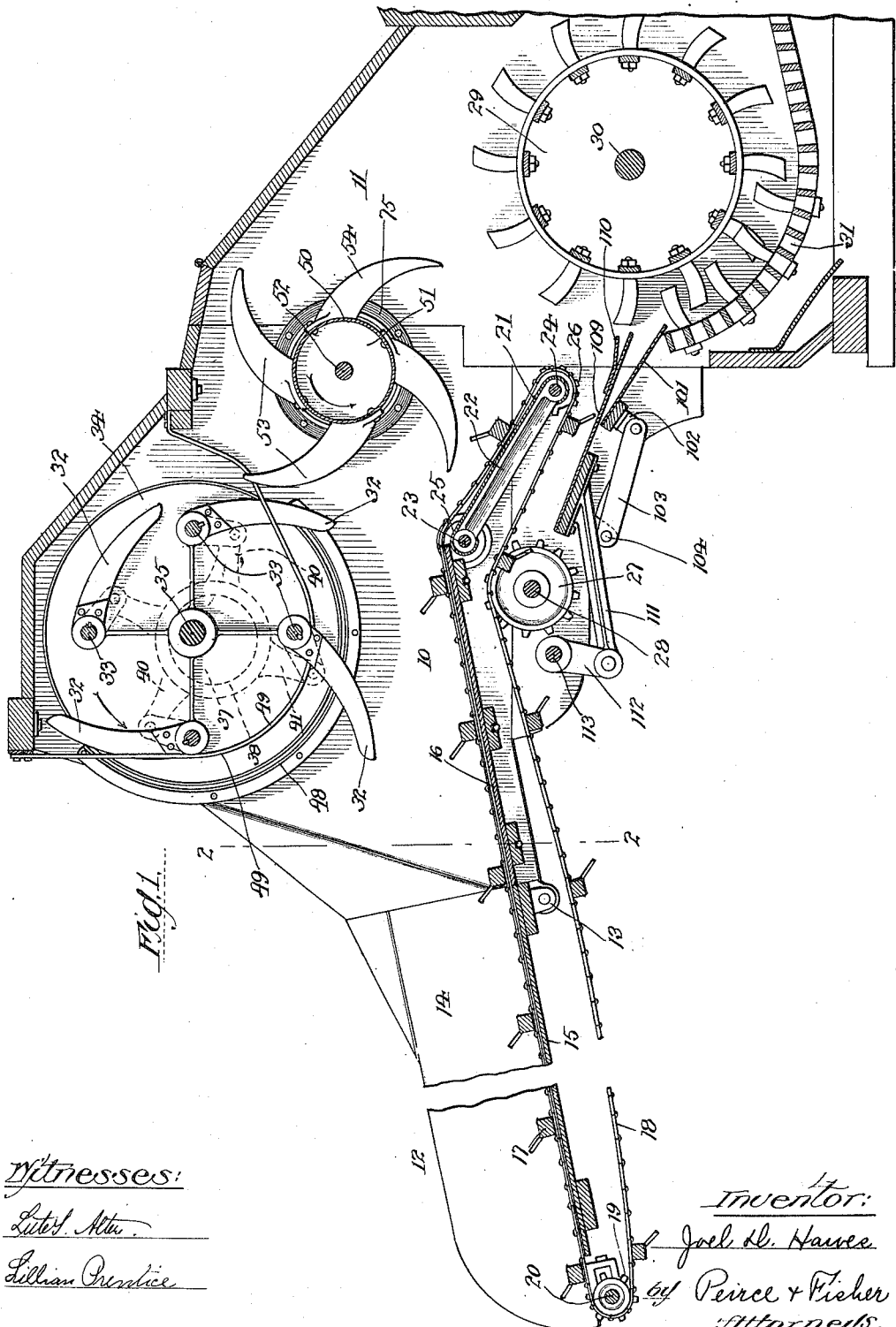

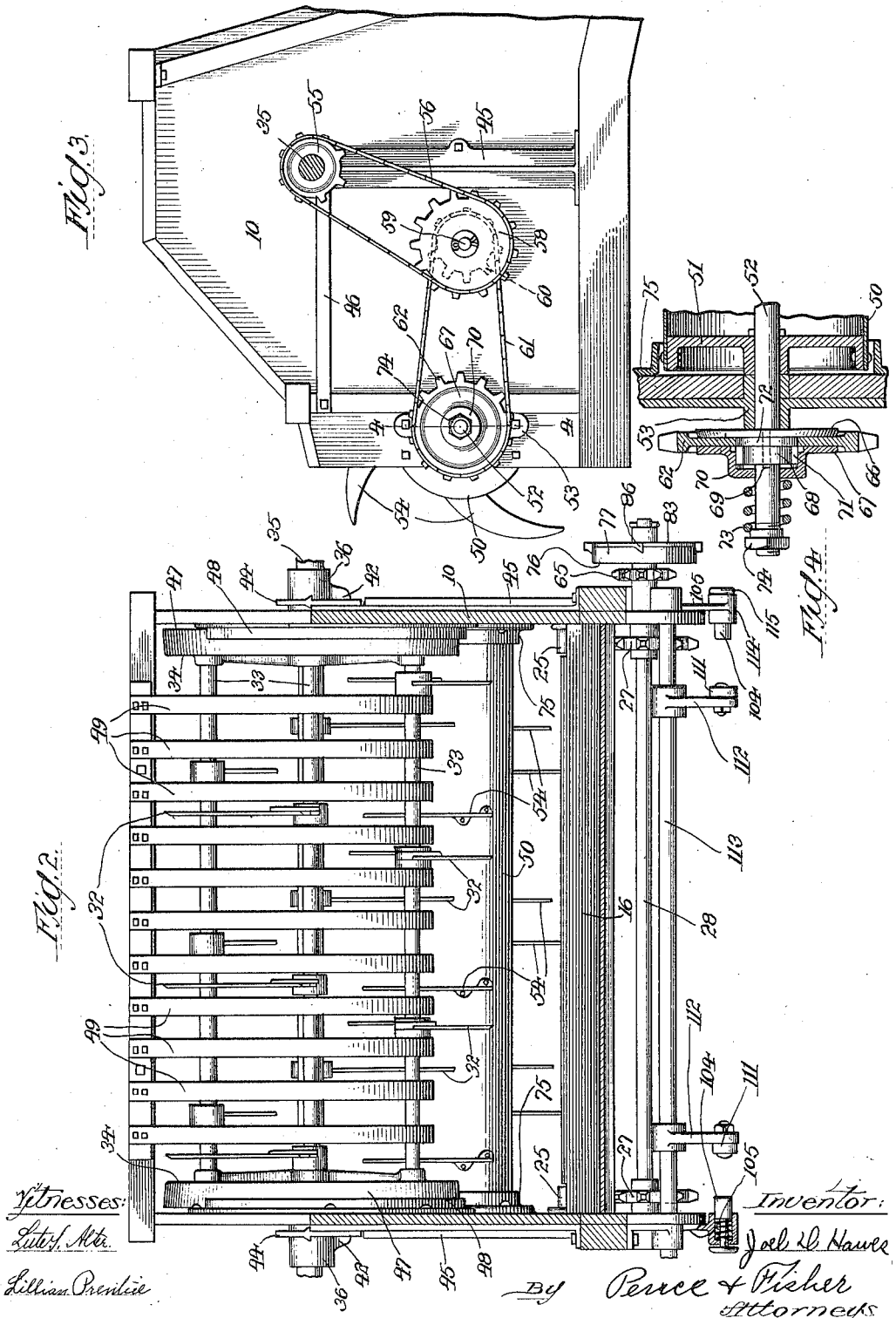

J. D. HAWES.
BAND CUTTER AND FEEDER.
APPLICATION FILED OCT. 18, 1905.
1,038,747.
Patented Sept. 17, 1912.
3 SHEETS—SHEET 3.
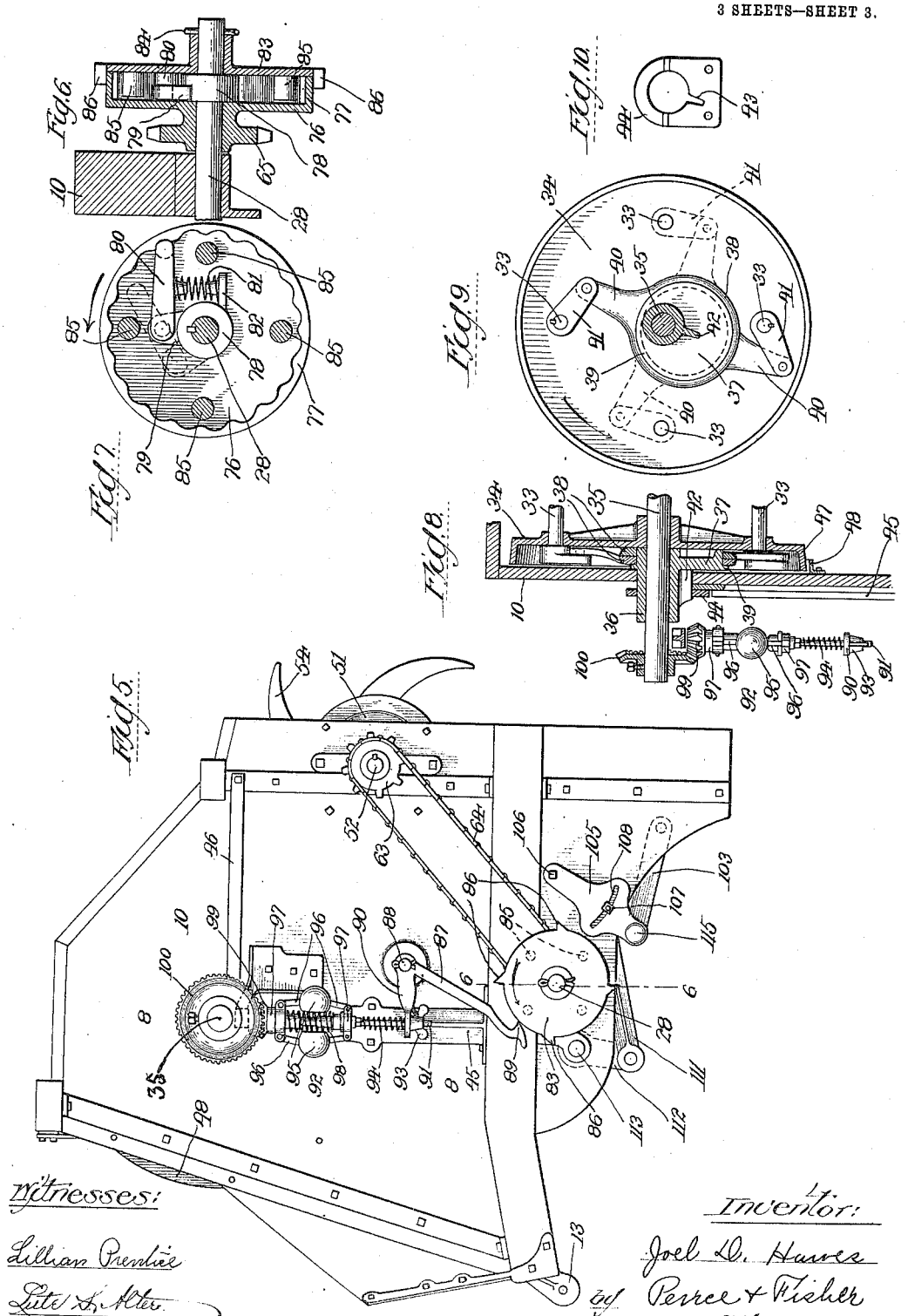

UNITED STATES PATENT OFFICE.

JOEL D. HAWES, OF WATERLOO, IOWA, ASSIGNOR TO WATERLOO THRESHING MACHINE COMPANY, OF WATERLOO, IOWA, A CORPORATION.

BAND-CUTTER AND FEEDER.

1,038,747.  Specification of Letters Patent.  Patented Sept. 17, 1912.

Application filed October 18, 1905. Serial No. 283,219.

*To all whom it may concern:*

Be it known that I, JOEL D. HAWES, a citizen of the United States, and a resident of Waterloo, county of Blackhawk, and State of Iowa, have invented certain new and useful Improvements in Band - Cutters and Feeders, of which the following is declared to be a full, clear, and exact description.

The invention relates to band cutters and feeders for threshing machines and seeks to provide improved retarding and regulating devices in combination with the band cutting knives.

Further objects of the invention are to provide an improved friction drive mechanism for the feeder and suitable governing mechanism therefor.

The invention also seeks to provide an improved construction of a removable pan.

With these and other objects in view, the invention consists in the features of construction, combinations and arrangements of parts hereinafter set forth, illustrated in the accompanying drawings and more particularly pointed out in the appended claims.

In the drawings Figure 1 is a longitudinal section through the improved band cutter and feeder shown attached to the front end of a threshing machine. Fig. 2 is a sectional view on line 2—2 of Fig. 1. Fig. 3 is an elevation showing the rear portion of one side of the improved feeding attachment. Fig. 4 is a detail section on line 4—4 of Fig. 3. Fig. 5 is a view similar to Fig. 3 showing the other side of the feeding attachment. Fig. 6 is a detail section on line 6—6 of Fig. 5. Fig. 7 is a side elevation of parts shown in Fig. 6 with the outer disk removed. Fig. 8 is a detail section on line 8—8 of Fig. 5. Fig. 9 is a view in elevation of the knife carrying head shown in Fig. 8. Fig. 10 is a detail elevation of a locking plate shown in Fig. 8.

The feeding attachment comprises the inner main portion 10 having inclosing side and top portions and which is attached to the front end of the casing 11 of the threshing machine. The outer section 12 of the feeder frame is connected by hinges 13 to the main casing 10 so that it may be folded back out of the way or swung outwardly into operative position, as shown in the drawings. The outer section is provided with side walls 14 and a bottom or floor 15. In operative position the bottom or floor 15 is in line with the inclined bottom or floor 16 of the main frame or inner section of the feeding attachment.

The endless carrier or raddle of the feeding attachment comprises the cross bars 17 connected to the chains 18 which, at the outer end of the folding section 10, pass over the sprocket wheels 19 on a cross shaft 20 that is suitably journaled at the outer end of the folding frame 12. From the sprocket wheels 19, the endless carrier passes back over the upwardly inclined floors 15 and 16 of the outer and inner sections of the feeding attachment. From the rear end of the inclined bottom 16 the endless carrier passes downwardly over an inclined floor 21 that is mounted on side bars 22. These side bars extend between, and are supported upon the cross shafts 23 and 24 that are mounted in the side walls of the main frame or casing 10. Pulleys 25 on the cross shaft 23 guide the chains 18 of the carrier over the angle between the inclined plates or bottoms 16 and 21. At the inner end of the feeding attachment the carrier chains 18 pass over sprocket wheels 26 mounted on the shaft 24. From the sprocket wheels 26 the chains pass rearwardly over the sprockets 27 fixed to the drive shaft 28 that extends between and is journaled in the side walls of the main frame or casing 10. By means of the endless carrier the grain is moved through the feeding attachment and delivered on to the threshing cylinder 29, mounted on a shaft 30 within the front end of the threshing machine casing 11 and above the concave or grate 31.

The curved band cutting knives 32 are mounted upon a series of cross shafts 33 which extend between the disks or heads 34. The disks or heads 34 are fixed to a cross shaft 35 extending through the side walls of the casing at a point above the rear end of the carrier floor 16 but somewhat in front of front end of the carrier floor 21. The knife supporting shafts 33 are journaled in the disks at the points near the periphery thereof as most clearly shown in Figs. 1, 8 and 9.

The shaft 35 is journaled in boxes or hubs 36 (see Fig. 8) which abut against the outer faces of the disks and extend through openings in the side walls of the main frame or casing 10. An eccentric 37 is located between the side wall of the casing and the inner face of the disk 34, and is fixed to the inner end of the hub 36. The eccentric is preferably cast in piece with the hub as shown. Two eccentric straps or rings 38 are mounted upon the eccentric 37 and are held in place between the outer face of the disk 34 and a flange 39 at the outer edge of the eccentric 37. Each eccentric strap or ring 38 is provided upon an arm 40 that is pivoted to a rock-arm 41 upon one of the knife-carrying shafts 33. The two eccentric straps or rings at one end of the shaft 35 are thus connected to diametrically opposed knife-carrying shafts 33. At the opposite end of the shaft and outside of the other disk 34 is arranged a similar eccentric having two eccentric straps or rings and similarly connected to the other knife-carrying shafts.

The eccentrics 37 and the hubs 36 are held against rotation, preferably by means of a fin or key 42 (see Fig. 8) which sets within a notch 43 in a plate 44 (see Fig. 10). Plate 44 is mounted upon the upper end of a standard 45 (see Fig. 3) rising from the main sill of the frame. A horizontal brace-rod 46 is preferably connected to the upper end of the standard.

The disks 34 are provided with outwardly extending peripheral flanges 47 so as to inclose the eccentrics and connecting links. The flange extends closely adjacent the inner faces of the side walls, and a semi-circular flanged piece 48 secured to the side wall of the casing, extends in front of and below the flange 47 and is arranged closely adjacent thereto so that straw, dust or other matter cannot readily enter the space between the disks and the side walls of the casing. The arrangement of the eccentrics is shown in detail at one end only of the knife-operating shaft 35, but it will be understood that an exactly similar arrangement is employed at the opposite end of the shaft. The curved knives are arranged between bent guard strips or bars 49 (see Figs. 1 and 2) secured at one end to the forward edge of the top wall of the main casing extending downwardly and rearwardly outside of the path of movement of the knife-carrying shafts 33 and secured at their rear ends to the top part of the main casing.

The eccentrics 37 are held by the fins 42 and plates 44 rigidly in the proper position to give the desired movement to the knives as the disks 34 and shaft 33 rotate with the shaft 35. The center of the eccentrics is located below and slightly in advance of the center of the shaft 35 so that as the knives approach their lowermost positions they are moved outwardly beyond the guards 49 and some of the bands on the bundles of grain will draw-out. As the knives pass the lowermost position they are drawn inwardly and rise vertically from the grain so that there is no tendency to wind the grain upon the revolving parts that carry the knives. The guards 49 also assist in preventing the winding of the grain on these parts.

At the outlet of the feeding attachment, in rear of the knives and over the rear end of the carrier or conveyer, is arranged a retarding device or feed regulator which preferably comprises a cylindrical drum 50 secured at its ends to heads 51 (see Fig. 4) and mounted upon a cross shaft 52. Shaft 52 is journaled in suitable bearings 53 in the sides of the main casing. Curved blades 54 are secured to the outer surface of the drum 50. The feed regulator rotates in the direction indicated by the arrow in Fig. 1 and the end of its blades 54 pass closely adjacent the band-cutting knives 32 so as to strip the grain from the knives as they rise up from their lowermost position. These blades are also arranged to pass closely adjacent the downwardly inclined rear end of the endless carrier and tends to strip the straw therefrom. These blades are arranged in vertical planes so that they project directly down into the straw to straighten or comb it out and break up any bunches. This feed regulator thus strips the straw from the knives and carrier, separates any bunches and throws it in a loose separated condition on to the top of the threshing cylinder 29. It also prevents the straw from being fed too rapidly to the threshing cylinder.

The main shaft 35 is driven from the threshing machine in any suitable manner. At one end this shaft is provided with a sprocket 55 (see Fig. 3) connected by a chain 56 to a larger sprocket 58 on a stud shaft 59. This stud carries a smaller sprocket 60 that is connected by a chain 61 to a larger sprocket 62 on the shaft 52 of the feed regulator or retarder. By reason of the gearing the feed regulator or retarder will be driven at a lower speed than the knives and will hold back the straw and prevent it from choking the threshing cylinder. At its opposite end the shaft 52 is provided with a sprocket 63 (see Fig. 5), that is connected by a chain 64 to a sprocket 65 (see Figs. 2 and 6) on the drive shaft 28 for the carrier or conveyer. The retarder shaft 52 is thus driven from the main shaft 35 and the carrier shaft 28 is driven from the regulator shaft 52.

To prevent choking the threshing machine with straw a friction drive is preferably provided for the regulator and carrier. For this purpose the sprocket 62 (see Fig. 4) on the shaft 52 is provided with flat faces and is held between a pair of friction disks 66 and 67. Disk 66 is provided with a hub 68 connected to the shaft 52 by a key 69. The hub 68 extends through an opening in the sprocket 62 and within a central off-set portion 70 on the friction disk 67. Keys 71 on the hub engage slots in the off-set portion 70 so that the friction disks are keyed together and to the shaft 52. The sprocket 62 is held between the disks upon a shoulder or flange 72 of the hub 68. A spring 73 coiled about the outer end of the shaft 52 extends between a nut 74 on the shaft and the friction disk 67 so that the sprocket is gripped between the friction disks 66 and 67. The pressure of the spring may be regulated by means of the nut 74. By reason of this friction drive the movement of the feed regulator and straw-carrier will be automatically arrested if more straw passes through the feeder than can be taken care of by the threshing cylinder. As soon as the excess is cleared away from the cylinder the feed will however, again automatically be thrown into operation. The ends of the drum 50 of the regulator or retarder preferably set within circular flanges 75 secured to the inner face of the side walls of the main casing so that straw or other material cannot work between the end of the drums and the walls.

The sprocket 65 is loose on the carrier drive shaft 28 and is connected to or cast in piece with the disk 76 which has an interiorly notched, peripheral flange 77. A collar 78 keyed to the shaft is provided on one side with a lug 79 to which is pivoted a dog 80, the round, outer end of which is arranged to be engaged by the notches of the flange 77 so that the shaft will be driven as the disk rotates in the direction of the arrow (see Fig. 7) through the medium of the dog 80 and collar 78. It will be noted that the dog 80 is eccentrically pivoted on the collar 78 so that the disk rotates in the direction of the arrow. The dog will be jammed securely into the notches of the disk flange and there will be no slipping between the connected parts. A coiled spring 81 extends between the dog and the lug 82 on the sleeve 78 and tends to rotate the dog toward the notched flange 77. The sleeve 78 and parts connected thereto is arranged between the disk 76, which abuts against its inner face and a companion disk 83 that abuts against its outer face and that is loosely held upon the shaft by a pin 84. The inner face of the disk 83 is provided with inwardly projecting pins 85, and the edge of the disk is provided with a corresponding number of projecting teeth. A latch 87 (see Fig. 5) mounted on the side wall of the casing by a pivot 88, is provided with a hooked end 89 arranged to engage the teeth or lugs 86 of the disk 83. The latch 87 is provided with an arm 90 arranged to engage the lower end of a stem 91 of a centrifugal governor 92. The arm 90 is adjustably connected to the governor stem by a thumb-nut 93 and a spring 94 which is mounted on the stem and engages opposite sides of the end of the arm. The centrifugal governor may be of any suitable construction. As shown, it comprises the weights 95 connected by links 96 to the upper and lower collars 97, the collars being normally held apart by the spring 98. The stem 94 is arranged to be lifted by the lower collar 97 as the weights 97 move outwardly. The upper collar 97 is provided with a beveled gear 99 driven from the gear 100 on the main drive shaft 35 of the feeder.

When the machine is started the hook 89 on the latch 87 will be in the path of the teeth or lugs 86 on the disk 83 so that the pins 85 on the disk are held against movement in the direction of the arrow and one of these pins will hold the dog 80 into position shown in dotted lines in Fig. 7 and out of engagement with the notched flange 77 of the revolving disk 76. As soon as the threshing cylinder and shaft 35, which is connected thereto, reach threshing speed, the centrifugal governor will be operated to shift the latch 87 and move the hook 89 thereon from engagement with the teeth or disk 83. Disk 83 will then be moved forwardly by reason of its frictional engagement with the flange 77 of the revolving disk 76, and the spring 81 will force the dog outwardly into engagement with the flange so that the carrier will be driven ahead to feed the grain into the machine. If for any reason the threshing cylinder falls below the desired speed, latch 87 will be shifted to reëngage and arrest the movement of disk 83 and pins 82. When so arrested the pins will engage the dog 80 and throw it out of engagement with the notched flange 77. It will be observed that the pins 85 are so located that when held against movement they will not abruptly arrest the movement of the dog 80 connected to the shaft 78, but will depress the dog as it moves past the pin against the tension of its spring 81. In this way the dog 80 will be successively depressed by the stationary pins and will only momentarily reëngage the notched disk so that the carrier drive shaft 28 will be brought to rest after a revolution or two with the dog in the position shown in dotted lines in Fig. 7. It should also be noted that the members of this clutch for the carrier drive shaft, are positively located together as soon as threshing speed is reached. With friction clutches heretofore employed for operating the carrier or conveyer of the feeder, there is usually more or less slipping of the clutch members as the cylinder reaches the threshing speed. The present clutch arrangement obivates this defect.

An inclined pan 101 is arranged beneath the rear end of the carrier. The rear end of this pan rests upon the forward end of the grate or concave 31. At its forward end the pan is provided with lugs 102 that are rigidly clamped to links or arms 103.

The outer ends of these arms are arranged to be engaged by pins 104 in the lower ends of swinging arms 105 (see Fig. 5). The latter are arranged on the outer side of the main casing and are carried on pivot bolts 106. Locking bolts 107 extend through slots 108 in the arms 105 and hold the arms and pan 101 in the desired adjusted position. An inclined shifting pan 109 is arranged above and rests upon the pan 101. Pan 109 is provided at its rear edge with an upwardly extending lip 110. At its rear end it is rigidly secured to the links or rods 111 which in turn are pivoted to rock-arms 112 on the cross rock-shaft 113. The pins 104 are preferably arranged to slide within sockets 114 in the ends of the arms 105. The pins extend through the sockets and are provided with buttons 115 on their outer ends. Springs 116 coiled about reduced portions of the pins are arranged within the sockets 114 and normally hold the pins in their innermost positions in engagement with the arms 103. The pins may be readily shifted outwardly to release the arms 103 and the lower portion 101 may then be readily removed from position. When removed it permits the pan 109 to swing outwardly on the pivots of the arms 111 so that access is very conveniently afforded to the threshing cylinder.

It is obvious that numerous changes may be made in the details of structure without departure from the essentials of the invention.

Having described my invention, what I claim as new and desire to secure by Letters Patent is:—

1. In a band cutter and feeder, the combination with the revolving band cutting knives and with the endless carrier, of a revolving feed regulator arranged in rear of the revolving knives and above the rear end of the carrier, said regulator comprising a shaft journaled in the feeder frame, heads fixed to said shaft, a cylindrical drum extending between said heads and a series of knives or blades secured to said drum and arranged in vertical planes and circular flanges fixed to the frame of the threshing machine and entirely surrounding the ends of said drum, substantially as described.

2. In a band-cutter and feeder, the combination with the revoluble shaft, of heads fixed to said shaft, a series of rock-shafts journaled at their ends in said heads and extending between the same, band-cutting knives fixed to said rock-shafts, crank-arms on the ends of said rock-shafts, a pair of fixed eccentrics, one at each end of said revoluble shaft, a series of eccentric straps on said eccentrics and connected one to each of said crank-arms, substantially as described.

3. In a band cutter and feeder, the combination with the revoluble shaft, of heads fixed to said shaft, rock-shafts extending between said heads, band cutting knives carried on said rock shafts, hubs through which said rotatable shaft extends mounted in the side wall of the feeder casing, eccentrics fixed to said hubs, eccentric straps connected to said rock shafts, fins on said hubs and notched plates with which said hubs and fins engage to hold the hubs and eccentrics against movement, substantially as described.

4. In a band cutter and feeder, the combination with the shaft, of heads on the ends of said shaft, cross knife-supporting rock-shafts extending between said heads, hubs within which said shaft is journaled abutting against the outer faces of said heads, an eccentric on the inner end of each of said hubs abutting against said heads and having flanges at their outer edges, eccentric straps held in place upon said eccentrics between said flanges and the outer faces of said disks, means for holding said hubs and eccentrics against movement, arms on said knife-supporting rock-shafts and rods connecting said arms and eccentric straps, substantially as described.

5. In a band cutter and feeder, the combination with the casing, of a rotatable shaft extending between the side walls of the casing, heads on the ends of said shafts within said casing, knife-carrying rock-shafts extending between said heads, hubs arranged in the side walls of the casing within which said rotatable shaft is journaled, eccentrics on the inner ends of said hubs between the casing side walls and said heads, eccentric straps connected to said rock-shafts, knives arranged in vertical planes fixed to said rock-shafts and curved guard bars secured to said casing and extending outside of the path of travel of said rock-shafts, said knives being arranged to project between said guard bars as they are rotated, substantially as described.

6. In a band cutter and feeder, the combination with the carrier or conveyer, of the main drive shaft arranged above the rear end of the conveyer, band-cutting knives operated by said drive shaft, a revolving feed regulator arranged in rear of said knives and above the rear end of said carrier, an operating shaft for the carrier, connecting gearing including an automatically-yielding friction device between said main drive shaft and said regulator, connecting gearing between said regulator and the carrier operating shaft, a clutch interposed in said gearing and a speed governor driven from said main drive shaft and having means for tripping said clutch into and out of operation.

7. In a band cutter and feeder, the combination with the carrier or conveyer, of the main drive shaft, a series of band-cutting knives operated by said shaft, a drive shaft for the conveyer, gearing between said shafts, an automatically yielding friction device interposed in said gearing, positively interlocking clutch members interposed in said gearing and a speed governor driven from said main shaft and having means for tripping said clutch members, substantially as described.

8. In a band cutter and feeder, the combination with the carrier or conveyer, of the main drive shaft, a series of band-cutting knives operated by said shaft, a drive shaft for the conveyer, gearing including an automatically yielding friction device between said shafts, a clutch interposed in said gearing comprising an eccentrically pivoted dog and a notched flange arranged to engage said dog and a speed governor driven from said main drive shaft and having means for tripping said dog without positively arresting its movement, substantially as described.

9. In a band cutter and feeder, the combination with the carrier or conveyer, of the main drive shaft, a series of band-cutting knives operated by said shaft, a drive shaft for the conveyer, gearing including an automatically yielding friction device between said shafts, a clutch interposed in said gearing comprising an eccentrically pivoted dog and a notched flange arranged to engage said dog, a series of pins for tripping said dog, a disk carrying said pins and a latch controlled by the main shaft for arresting the movement of said disks and pins, substantially as described.

10. In a band cutter and feeder, the combination with the carrier having a downwardly inclined rear portion, a normally stationary pan below the rear end of said carrier, a shifting pan resting upon said stationary pan and means for releasably supporting said normal stationary pan, substantially as described.

11. In a band cutter and feeder, the combination with the carrier, of a stationary pan below the rear end of the carrier and supported at its rear edge upon the concave of a threshing machine, arms rigidly secured to said stationary pan and extending forwardly therefrom, spring pins for releasably supporting said arms, a shifting pan resting on the forward edge of said stationary pan, operating rock-arms for said shifting pan arranged in front thereof and connecting rods pivoted to said rock arms and connected to the forward end of said shifting pan, substantially as described.

JOEL D. HAWES.

Witnesses:
WM. H. STANDISH,
ADA M. STANDISH.